United States Patent [19]

Anders

[11] 4,352,603
[45] Oct. 5, 1982

[54] PNEUMATIC TUBE SYSTEM TELLER TERMINAL CONSTRUCTION

[75] Inventor: Walter G. Anders, Canton, Ohio

[73] Assignee: Diebold Incorporated, Canton, Ohio

[21] Appl. No.: 178,559

[22] Filed: Aug. 15, 1980

[51] Int. Cl.³ .............................................. B65G 51/26
[52] U.S. Cl. ...................................... 406/27; 406/26; 406/28; 406/112; 406/149
[58] Field of Search .................. 406/12, 19, 21, 22, 406/26, 27, 28, 29, 31, 74, 110, 111, 112, 147–150, 176–180

[56] References Cited

U.S. PATENT DOCUMENTS

| | | | |
|---|---|---|---|
| 3,237,882 | 3/1966 | Grosswiller et al. | 406/110 |
| 3,601,337 | 8/1971 | Bullock et al. | 406/110 X |
| 3,659,809 | 5/1972 | Cook | 406/112 |
| 3,790,102 | 2/1974 | Tearne et al. | 406/112 |
| 3,841,584 | 10/1974 | Robinson et al. | 406/21 |
| 3,964,693 | 6/1976 | Thomas | 406/179 |
| 3,985,316 | 10/1976 | Weissmuller | 406/110 |
| 4,059,246 | 11/1977 | Anders et al. | 406/110 X |
| 4,135,684 | 1/1979 | Willey | 406/112 X |

Primary Examiner—Jeffrey V. Nase
Attorney, Agent, or Firm—Frease & Bishop

[57] ABSTRACT

A banking service pneumatic tube system teller terminal having a single conveyor tube. A carrier is transported in the system and is removable from the terminal housing formed of molded plastic material. The housing may be installed for carrier arrival vertically from above or below. The housing has an access opening closed by a cradle-door movable between open and closed positions. The cradle has a cylindrically walled carrier receiving compartment located between cylindrical end portions of the housing when the door is closed. One housing end portion is coupled with an end of the system conveyor tube. A carrier arrival switch is mounted on the cradle actuated by carrier arrival to automatically open the door by release of latch mechanism mounted on the cradle which normally locks the cradle-door in closed position. A carrier is presented in the cradle outside of the housing when the door opens. The cradle-door is manually closed, automatically actuating the latch mechanism to lock the cradle-door closed. The teller terminal has an extremely simple construction and comprises very few components and eliminates a motor drive for operating the cradle-door.

22 Claims, 26 Drawing Figures

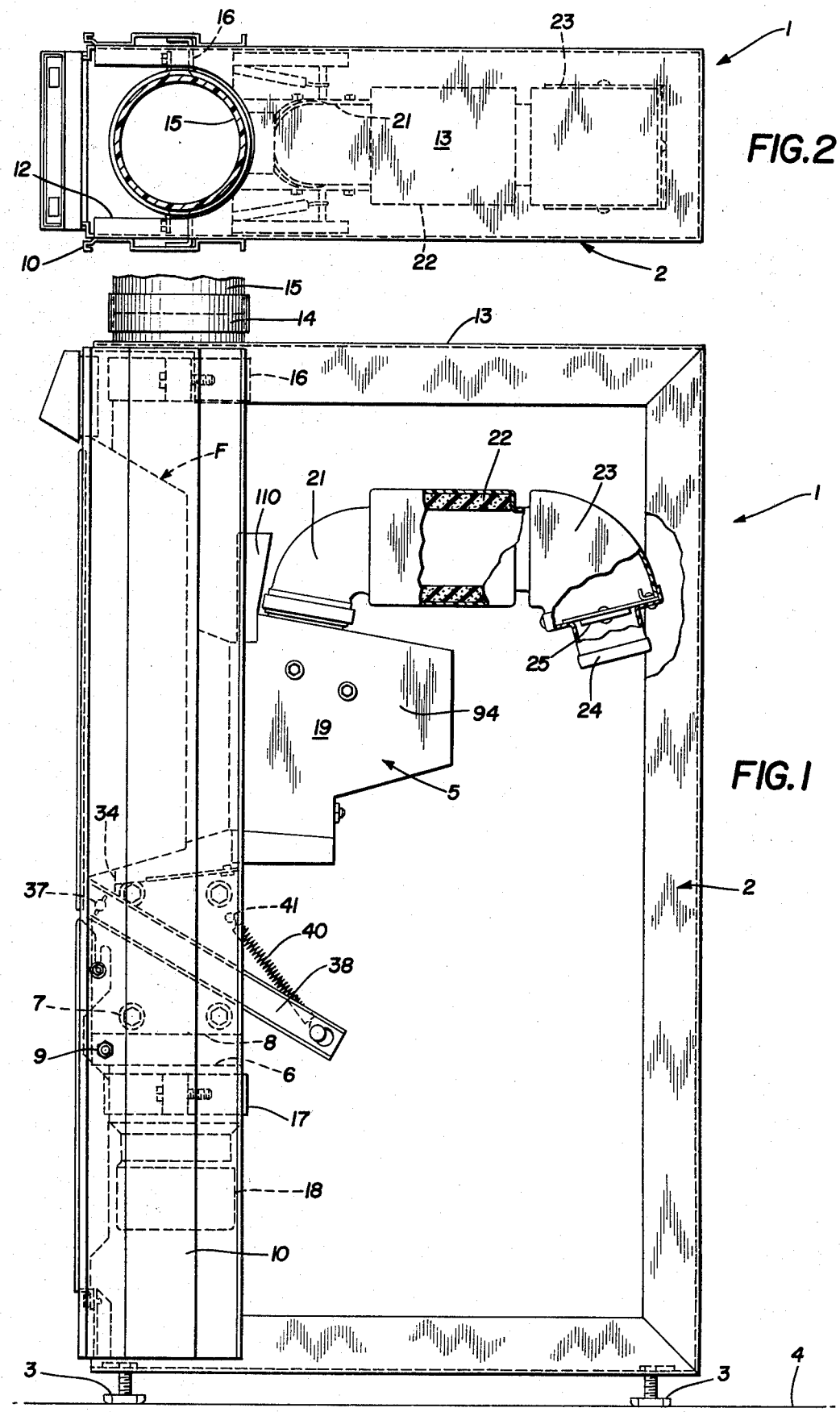

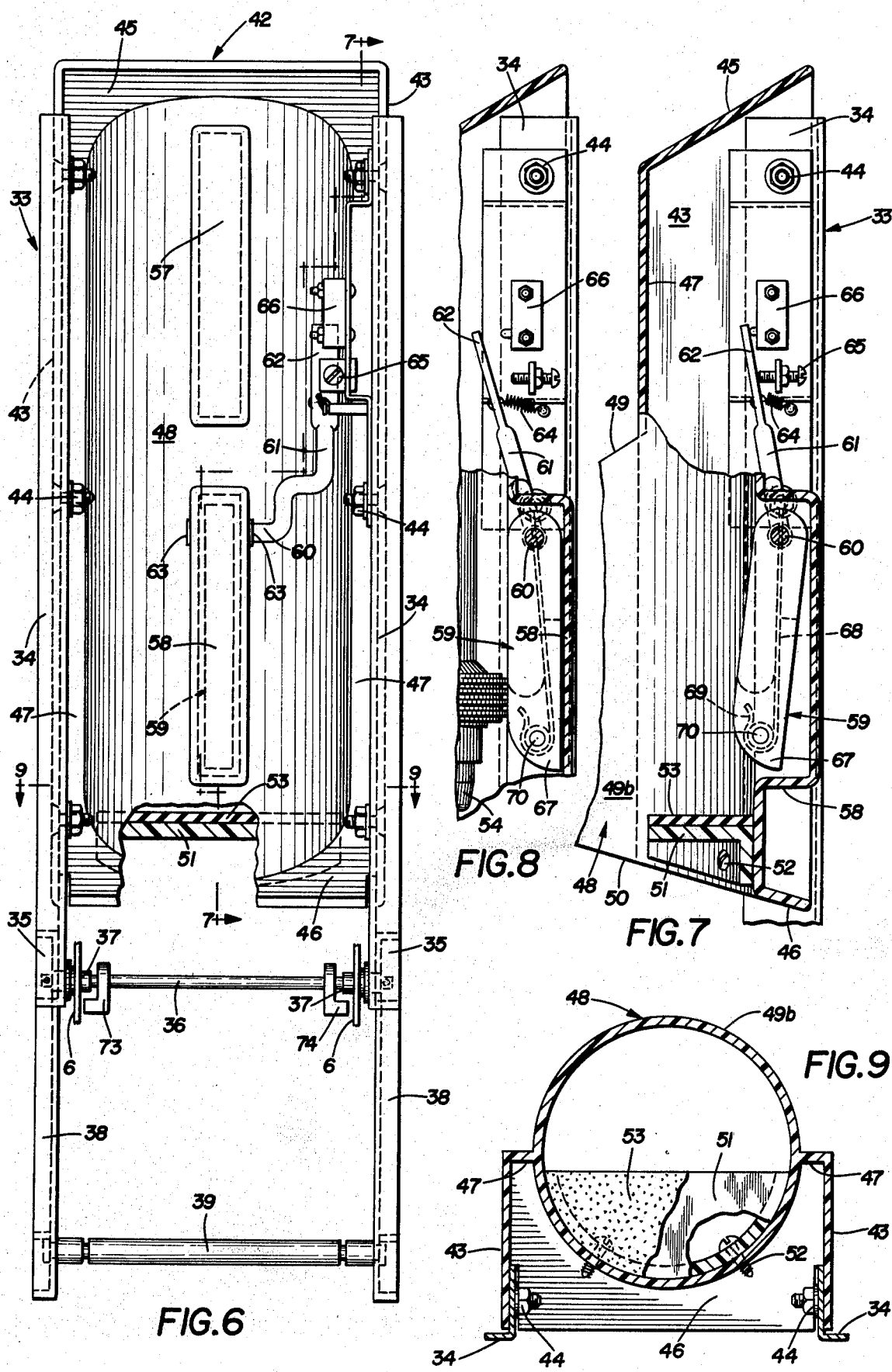

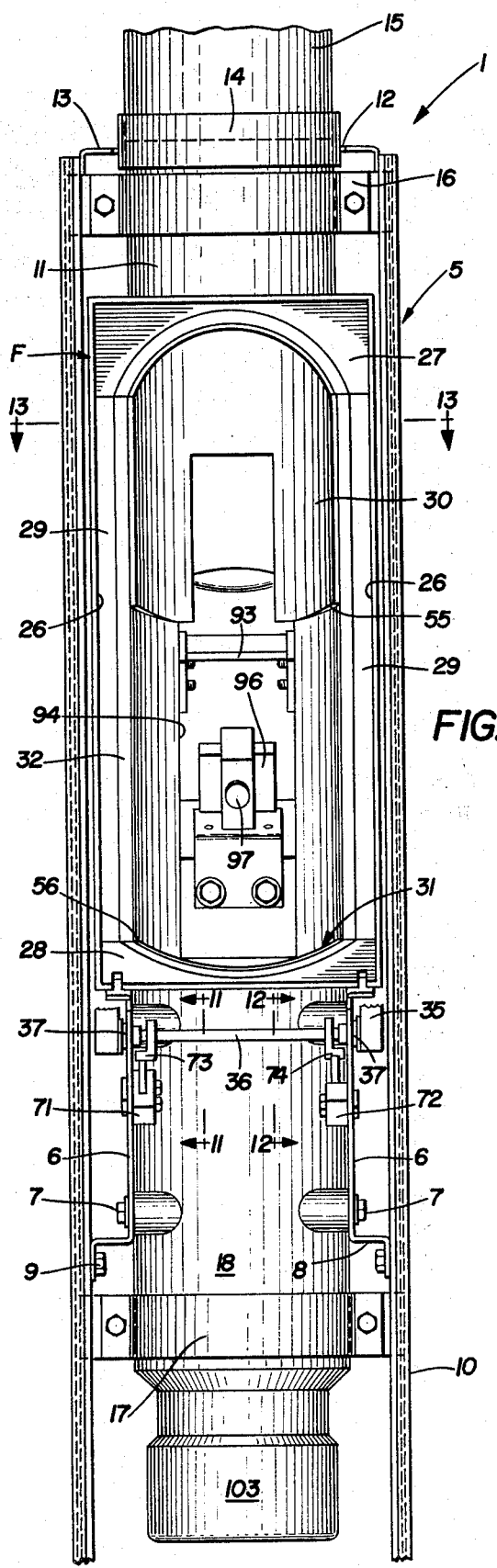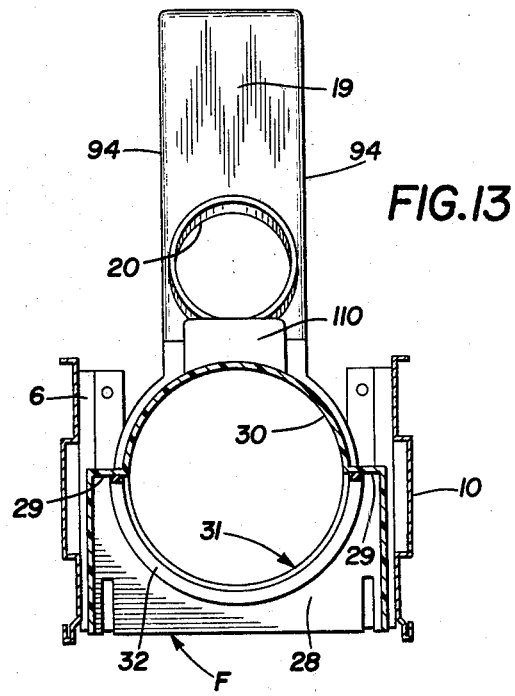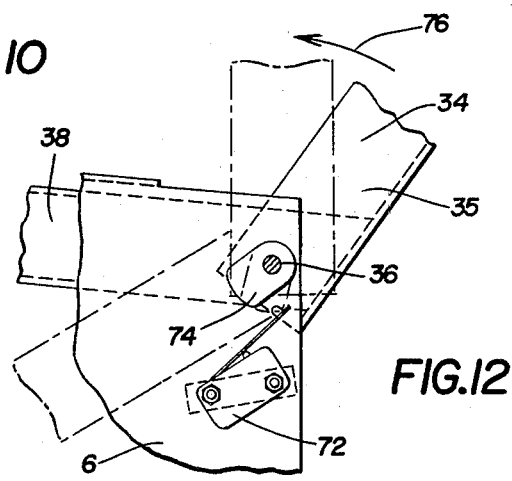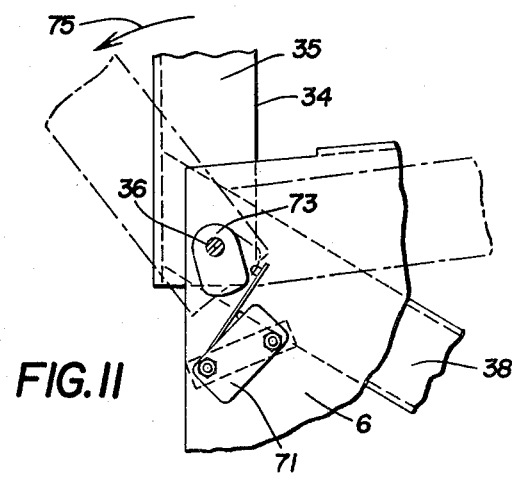

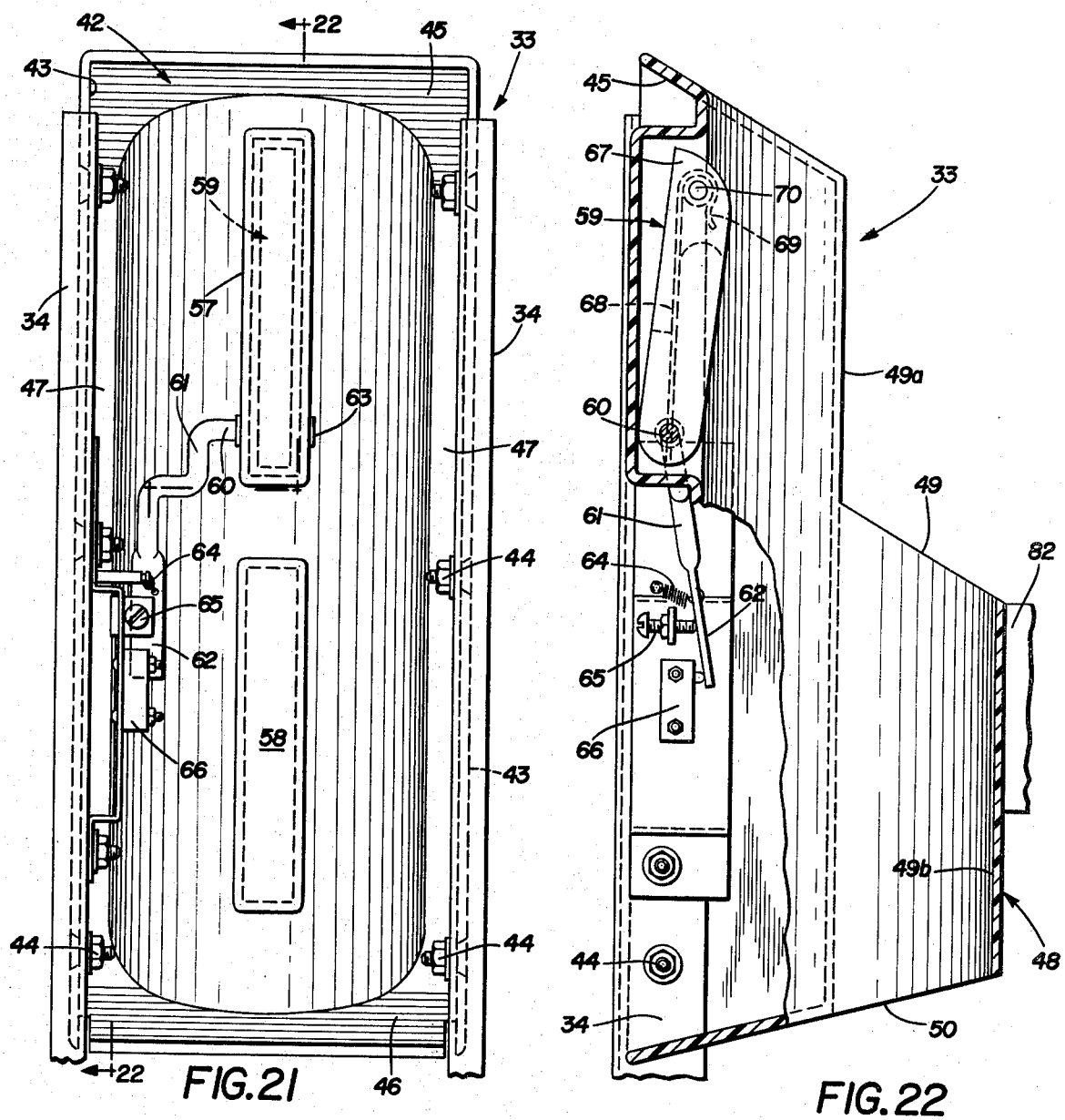
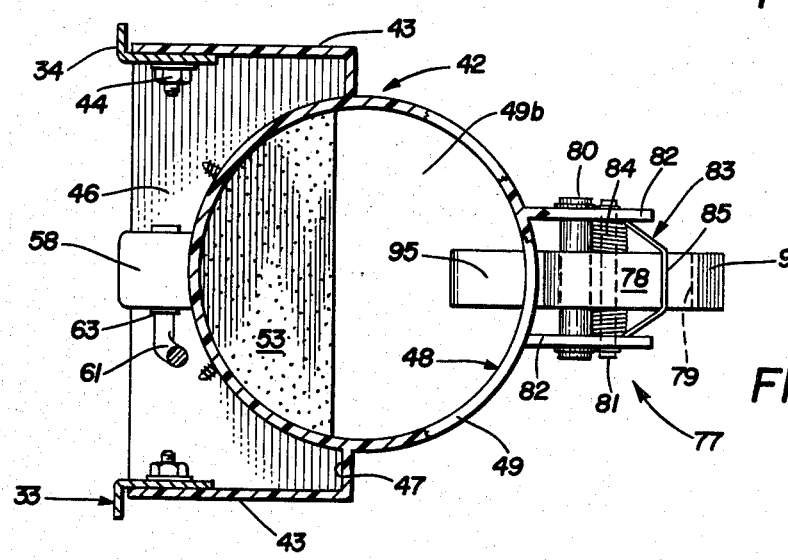
FIG. 21   FIG. 22   FIG. 14a

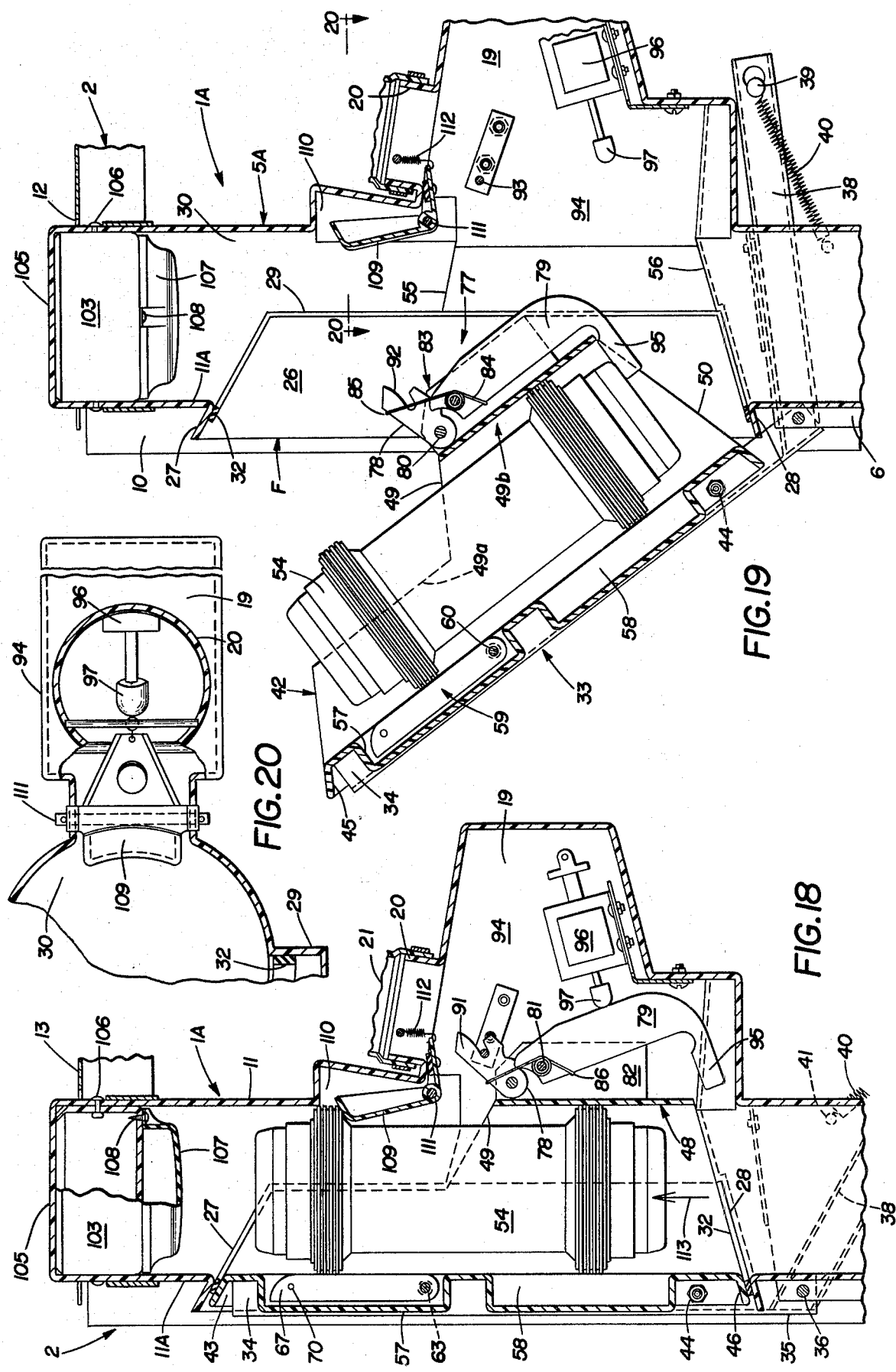

PNEUMATIC TUBE SYSTEM TELLER TERMINAL CONSTRUCTION

CROSS-REFERENCE TO RELATED PATENTS

Components of the pneumatic tube system teller terminal construction comprise improvements over the constructions or components of devices shown in U.S. Pat. Nos. 3,237,882 and 4,059,246.

BACKGROUND OF THE INVENTION

1. Field of the Invention

The invention relates to a pneumatic tube system in which a carrier is moved rapidly by air pressure or vacuum back and forth through a single conveyor tube extending between customer and teller terminals, the customer terminal being located at an outside drive-up customer banking facility visible from a teller terminal located inside a bank building. More particularly, the invention relates to a teller terminal construction for a pneumatic tube system in which the carrier that passes through the single conveyor tube is removable from the system at both tube terminals.

In addition, the invention relates to an extremely simple basic pneumatic tube system teller terminal construction that may be installed for carrier arrival moving generally vertically downward from above into the terminal housing; or may be installed for carrier arrival moving generally vertically upward from below into the terminal housing. A terminal installed for carrier arrival from above sends the carrier from above, and similarly a terminal installed for carrier arrival from below sends the carrier from below into the system conveyor tube.

Further, the invention relates to a simple teller terminal construction in which a carrier received in the terminal from above or below comes to rest on and is held on a semicircular cradle surface of a pivoted cradle-door biased to open but normally latched in a position closing an opening formed in the terminal casing. The carrier is presented to a teller when the cradle-door is unlatched and opens pivotally outward automatically upon carrier arrival at the terminal.

Also, the invention relates to a simple teller terminal construction involving housing and mechanical components having the same primary or basic construction, operation and assembly, which are altered only slightly in components' location and housing connection with the system conveyor tube when installed, selectively, for either carrier arrival from above or below.

Moreover, the invention relates to a pneumatic tube system teller terminal of the type described in which a motor drive means for operating the cradle-door is eliminated, since the cradle-door opens automatically upon carrier arrival at the terminal and the cradle-door is closed manually by the teller.

Finally, the invention relates to a simple teller terminal construction for a pneumatic tube system in which the terminal housing and cradle-door, when the latter is closed, form a cylindrical continuation of the pneumatic tube system conveyor tube connected with the terminal housing vertically from above or below.

2. Description of the Prior Art

Many types and kinds of pneumatic tube system terminals are known for carrying out banking services between a customer drive-up station and a teller inside a bank building with visibility between the customer and the bank teller.

Included among these known terminals are the devices in U.S. Pat. Nos. 3,237,882, 3,659,809 and 3,790,102 each of which involves a single tube system with arrival of the carrier at the terminal vertically from below, as well as sending the carrier into the system single conveyor tube from below.

U.S. Pat. No. 3,237,882 involves a system wherein the carrier is maintained captive at the terminal. The terminal may be either a customer or teller terminal. The terminal door is motor-driven to present the captive carrier to the user.

U.S. Pat. No. 3,659,809 involves a single tube system with a removable carrier. The terminal door is motor-driven in the absence of which a special valving arrangement prevents the door, which is spring biased closed, from being blown open when the terminal is subjected to system pressure. The terminal is primarily a customer terminal, a teller terminal being shown diagrammatically without details of construction and operation being set forth, if different from the customer terminal.

U.S. Pat. No. 3,790,102 shows a terminal which apparently may be used either as a customer or teller terminal wherein there is motor-driven actuation of the door to present a carrier to the user when opened.

None of the three patents enumerated above provide any means for receiving and sending a carrier vertically from above the terminal; and the devices in the patents require motor-driven actuation of the terminal door or special valving to prevent door blowout.

U.S. Pat. No. 4,059,246 eliminates any motor-drive for terminal doors but requires a two-tube system and only provides for carrier arrival from below in each of two differently constructed customer or teller terminals.

U.S. Pat. No. 3,985,316 suggests a basic terminal construction which may be installed for carrier arrival and sending from either above or below. However, it requires a movable carlike cradle which receives and holds a carrier, power-driven to present an arriving carrier to a user upon opening a separate sliding door through which the car-cradle is projected when the door is open.

The prior art patents discussed above representative of known prior terminal construction all involve devices which are relatively complicated, which in most instances require power-driven operation of the terminal door, which have many parts and assembly that may require repeated maintenance and adjustment, and, excepting in one instance, which cannot be installed to accommodate carrier arrival at the terminal vertically from above or below.

Accordingly, a need exists in the field of drive-up banking service equipment for a simple pneumatic tube teller terminal construction having relatively few simply designed structural and operating components and parts, operative in a single tube system automatically to present to a teller a carrier upon arriving at the teller terminal, without motor drive means for the cradle-door, in which the terminal construction may be selectively installed for carrier arrival vertically from above or below, and in which the cradle-door is provided with a simple latch mechanism having few parts mounted on the cradle-door for positively locking the cradle-door in closed position.

SUMMARY OF THE INVENTION

Objectives of the invention include providing a new teller terminal construction for a single conveyor tube pneumatic tube system having a simplified design, arrangement and operation for providing banking services wherein the terminal is adapted for installation for carrier arrival vertically from above or below; providing such construction wherein the terminal housing is formed of molded plastic material with a basic structure which may be modified for connection or coupling of one or another of its spaced cylindrical, axially aligned, cup-shaped, end portions with an open end of a system conveyor tube directed vertically downward or upward for system carrier arrival from above or below; providing such construction in which modification of the terminal housing basic structure involves mere removal of part of one or the other cup-shaped end portion for coupling the cylindrical remainder of said cup-shaped end portion with a system conveyor tube end, and, in one instance, utilizing the removed portion in the other housing cup-shaped end portion as a part of bumper means for stopping carrier movement upon its arrival in the housing; providing such construction in which the housing walls between the spaced cylindrical cup-shaped end portions are formed with cylindrical wall sectors forming an extension of the tubular cup-shaped housing end portions; providing such construction in which the housing is formed with a generally rectangular opening between the cup-shaped end portions closed by a rectangular cradle-door pivotally mounted on the housing having cylindrically shaped cradle wall portions complementary to the housing cylindrical wall sectors to form with the housing cylindrical sectors, when the cradle-door is closed, a cylindrical compartment axially aligned with and a continuation of the spaced housing cylindrical end portions located therebetween; providing such construction in which the cradle compartment portion forms a holder for an arriving carrier to present the carrier to a teller when the door is opened; providing such construction in which carrier arrival switch means is mounted on the cradle-door selectively at one or another location respectively actuated by a carrier arriving from above or below; providing such construction with latch means comprising pawl and lever members each pivotally mounted on the cradle-door having biased interengageable cam stops and notches operative to latched and unlatched positions, wherein the pawl member in latched position engages a latch member on the housing to lock the cradle-door in closed position, and wherein the latch means is solenoid actuated to unlatched position to unlock the door automatically upon arrival of a carrier at the terminal; providing such construction in which the latch means comprises only three parts, a pawl member, a lever member, and a spring, all mounted on the cradle-door and solenoid actuated to control the cradle-door, replacing more than 100 parts in a prior pneumatic tube system terminal door operation and control means; providing such construction in which a carrier arriving from above is held in the cradle compartment during opening and closing cradle-door movement by carrier stop and retainer means mounted on the cradle-door, or in which a carrier arriving from below is held cooperatively in the cradle compartment by retainer means mounted on the housing or by hook means formed as a part of the latch means lever member during opening or closing of the cradle-door; providing such construction in which motor operation of the cradle-door between open and closed positions is eliminated, and wherein the cradle-door is normally locked in closed position, is biased to open position when unlocked automatically upon arrival of a carrier at the terminal, and is manually moved to closed position where it is automatically locked in such position; and providing such construction, arrangement and operation which is simple to construct of essentially the same components for carrier arrival from either above or below, which is reliable in operation, which is readily serviced and convenient to use, which overcomes many problems that have existed in the art of pneumatic tube system used for banking services, and which satisfies the indicated objectives.

These and other objectives and advantages may be obtained by the single conveyor tube banking service pneumatic tube system of a type having a conveyor tube extending between a teller terminal and a remote customer terminal supplied with a vacuum or pressure from system blower and air shifter units to transport a carrier between such terminals characterized in that the teller terminal, in general terms, may be stated as including a terminal housing having cylindrically curved wall portions forming a vertically extending passage terminating in cylindrical end portions one of which is closed; means for coupling the other housing end portion with a vertically extending conveyor tube end; the housing wall portions being formed with an opening communicating with said passage between said cylindrical end portions; door means having a cradle mounted thereon for closing said housing opening; the cradle-door being pivotally mounted on the housing movable between open and closed positions; the cradle having a cylindrical wall portion aligned with and between the housing cylindrical end portions in which a carrier is received when the cradle-door is closed; means for supporting a carrier in the cradle upon arrival therein; and means automatically pivotally opening the cradle-door with a carrier in the cylindrical cradle portion upon carrier arrival at the terminal.

BRIEF DESCRIPTION OF THE DRAWINGS

Preferred embodiments of the invention—illustrative of the best mode in which applicant has contemplated applying the principles—are set forth in the following description and shown in the drawings and are particularly and distinctly pointed out and set forth in the appended claims.

FIG. 1 is a side elevation of the new teller terminal with outer cabinet walls removed, illustrating the mounting frame for the teller terminal and mechanism mounted therein;

FIG. 2 is a top plan view of the parts shown in FIG. 1;

FIG. 6 is an enlarged front elevation, with parts broken away, looking in the direction of the arrows 6—6, FIG. 4, of the cradle-door assembly removed from the housing;

FIG. 7 is a sectional view, with parts broken away, taken on the line 7—7, FIG. 6 showing the carrier arrival switch mechanism in normal position at one location in the cradle-door for carrier arrival from above;

FIG. 8 is a fragmentary view of a portion of FIG. 7 showing the carrier arrival switch mechanism actuated by an arrived carrier;

FIG. 9 is a cross section of the cradle-door taken on the line 9—9, FIG. 6;

FIG. 10 is an enlarged front elevation of the terminal housing looking in the direction indicated by the arrows 6—6 in FIG. 4 with the cradle-door removed, excepting for fragmentary portions of the cradle-door mounting and of the pivot rod on which the cradle-door is pivotally mounted on the housing;

FIG. 11 is an enlarged fragmentary view, looking in the direction of the arrows 11—11, FIG. 10, of portions of the cradle-door door assembly shown in full lines when the cradle-door is closed, and in dot-dash lines when the cradle-door is open and actuating an "open door" switch;

FIG. 12 is a view similar to FIG. 11 looking in the direction of the arrows 12—12, FIG. 10, but showing portions of the door assembly in full lines in open position, and in dot-dash lines in closed position and actuating a "closed door" switch;

FIG. 13 is a cross-sectional view taken on the line 13—13, FIG. 10;

FIG. 14A is an enlarged fragmentary section taken on the line 14A—14A, FIG. 5, with the carrier removed;

FIG. 18 is an enlarged sectional view similar to FIG. 4 but showing the housing and components modified and installed for carrier arrival from below, the cradle-door being closed;

FIG. 19 is a view similar to FIG. 18 but showing the cradle-door in open position;

FIG. 20 is a sectional view similar to FIG. 13 but taken on the line 20—20, FIG. 19 illustrating carrier retainer means mounted in the housing which holds a carrier arriving from below;

FIG. 21 is a view similar to a portion of FIG. 6 but showing the carrier arrival switch mechanism located on the cradle-door in another position for actuation by a carrier arriving in the terminal from below;

FIG. 22 is a vertical sectional view of the parts shown in FIG. 21 taken on the line 22—22, FIG. 21;

Similar numerals refer to similar parts throughout the various Figures of the drawings.

DESCRIPTION OF THE PREFERRED EMBODIMENTS

Figure 3:
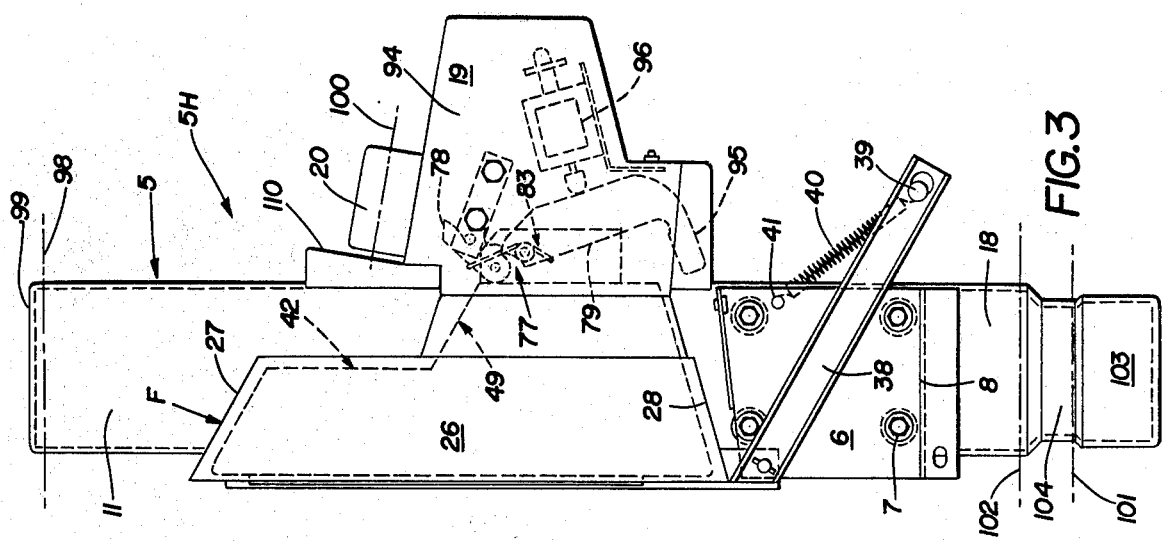
FIG. 3 is a side elevation of the new teller terminal housing with a cradle-door assembled thereto, in basic form before modification for installation for carrier arrival from either above or below.

A pneumatic tube banking system teller terminal incorporating the components of the invention installed for carrier arrival from above is indicated generally at 1 and is described in connection with FIGS. 1 through 17 and 23; and is indicated generally at 1A installed for carrier arrival from below described in connection with FIGS. 18–23. Terminals 1 and 1A are designed to permit communication and physical banking transactions between such teller terminal located inside a bank building and a customer terminal located at a bank drive-up station, preferably with visual communication between the teller and customer and verbal communication by known audio systems.

The new terminals 1 or 1A may be part of an installation such as shown in U.S. Pat. No. 4,059,246 simplified to use a single pneumatic system conveyor tube extending between a customer terminal and a teller terminal; and a plurality of teller terminals 1 or 1A may be located side by side at the teller station within a bank building attended by one teller.

The pneumatic tube banking system arranged as shown in U.S. Pat. No. 4,059,246 may be modified further by installing a single tube system customer terminal such as shown in my copending application Ser. No. 156,690, filed June 5, 1980, entitled Pneumatic Tube System Customer Terminal Construction at the other end of each single tube system conveyor tube served by the improved teller terminal 1 or 1A described herein.

The improved construction of the present invention initially is described below (FIGS. 1–17, 23), with respect to carrier arrival from above at a teller terminal 1. The terminal 1 has a mounting frame 2 supported on adjustable feet 3 on building floor 4. The frame 2 may be covered by typical cabinet walls not shown.

A housing, generally indicated at 5, has mounting plates 6 bolted thereto at 7 (FIG. 3) at either side of the housing and each mounting plate 6 has an outwardly offset flange 8 bolted at 9 to a frame side column member 10. The upper housing cylindrical end portion 11 extends upward through a notched end 12 of the frame top wall 13 and is coupled in any usual manner at 14 with the vertically, downwardly directed end 15 of the conveyor tube for the pneumatic tube system.

The housing 5 preferably also may be supported further on the mounting frame 2 by upper and lower clamping bands 16 and 17 surrounding the upper housing cylindrical end portion 11 and the lower housing cylindrical end portion 18, the bands 16 and 17 being mounted in any suitable manner on the frame columns 10.

The housing 5 has a rearwardly projecting boxlike compartment portion 19 formed with an outlet nipple 20 connected by tube 21 and muffler 22 with an outlet member 23 having an outlet part 24 closed by a flap valve 25.

The front portion of the housing 5 opposite the boxlike portion 19 is provided with a boxlike frame for the terminal door, generally indicated at F, formed by parallel spaced vertical side walls 26, an upwardly, outwardly tapered top wall 27 and a lower outwardly tapered bottom wall 28. The frame F has elongated narrow back wall portions 29 extending in an axial direction with respect to the upper and lower housing cylindrical end portions 11 and 18 and projecting laterally diametrically outward therefrom, so that housing wall portions above and below the compartment 19 are semicircular in cross section as indicated at 30 in FIG. 13.

Figure 23:
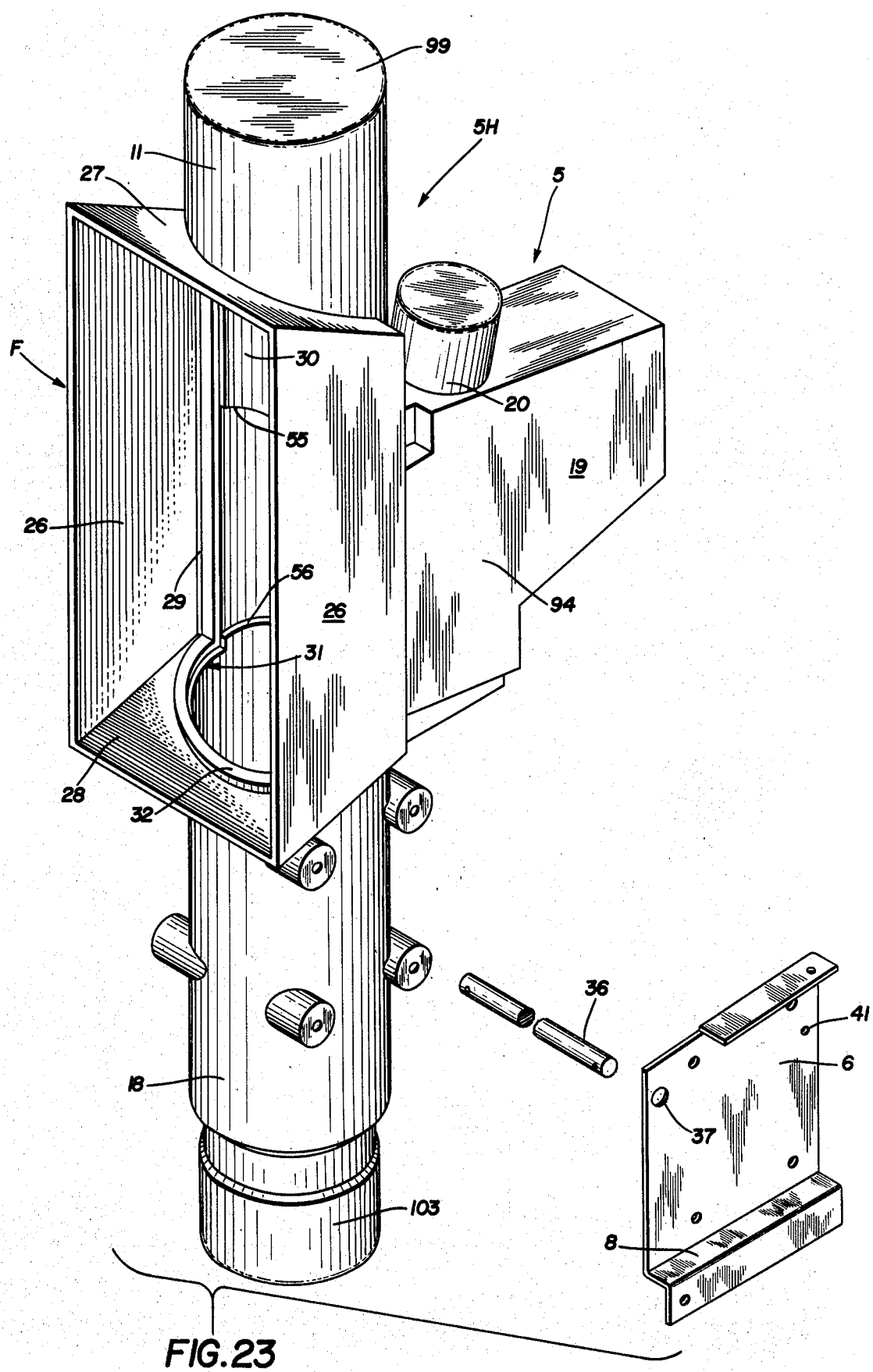
FIG. 23 is a somewhat diagrammatic perspective view of the improved basic housing member adapted when modified for installation in a teller terminal for carrier arrival from either above or below; related mounting and cradle-door pivot parts being shown in exploded positions.

Similarly the upper end of the lower cylindrical end portion 18 of the housing has a semicircular intersection with the bottom frame wall 28 indicated at 31 in FIGS. 13 and 23. Thus, the housing 5 has a cylindrical passage wall extending from the coupling 14 at the top thereof to the location of the lower clamping band 17 at the lower end of the housing excepting for lateral portions where the rear boxlike compartment 19 and the frame F intersect with said passage wall.

Gasket sealing means 32 lines inner surfaces of the boxlike frame F along the intersection of the frame walls with the cylindrical housing passage wall, well shown in FIG. 23, for a purpose to be described below.

A door frame, generally indicated at 33, formed by spaced, vertical angle members 34 connected at their lower ends 35 with a pivot rod 36 journaled at 37 at the upper front corners of the mounting plate 6, thus is pivotally mounted on the housing 5 for opening and closing movement (FIGS. 6, 10 and 23). Downwardly, rearwardly extending angle strut bars 38 fixed to the lower ends 35 of members 34 at the connection with the pivot rod 36 extend beyond the rear portion of the lower housing cylindrical end portion 18 (FIGS. 4 and 5); and are connected at their lower ends by lower door frame member 39.

Figure 4:
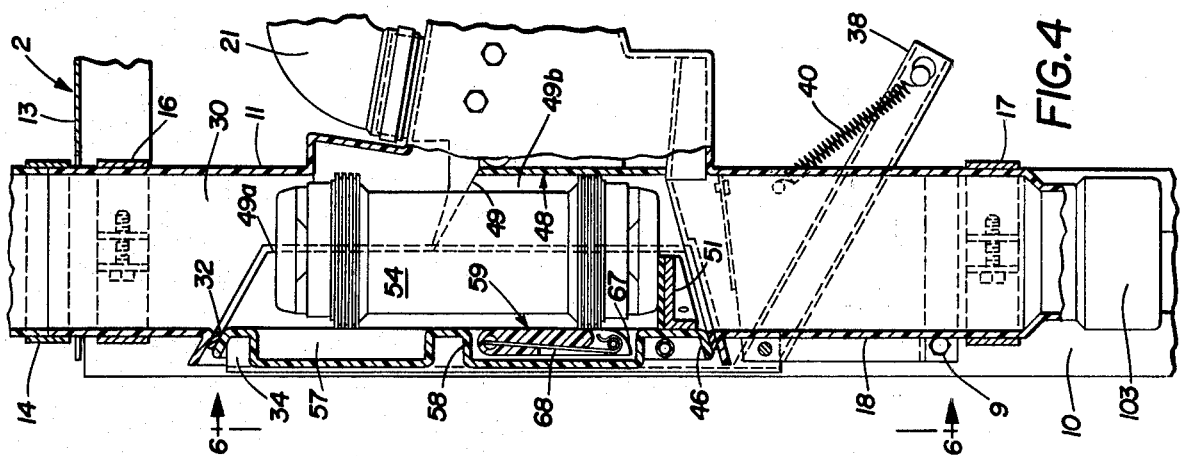
FIG. 4 is a vertical, sectional view similar to FIG. 3 illustrating the housing modified for and installed in the terminal mounting frame for carrier arrival from above, a carrier being shown in the compartment of the closed cradle-door, and parts of the mounting frame being broken away.
Figure 5:
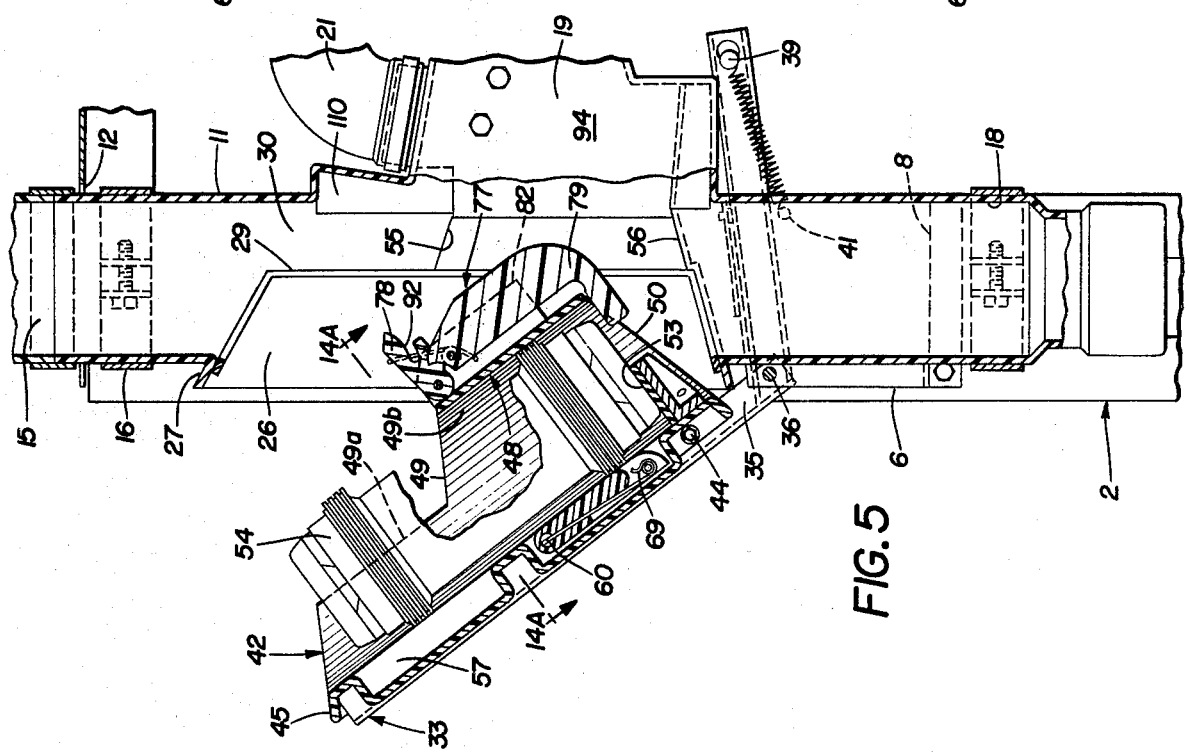
FIG. 5 is a view similar to FIG. 4 showing the cradle-door in open position.

Spring means 40 are tensioned between connections at 41 with mounting plates 6 and with the outer ends of the angle strut bars 38. The door members 34 and 38 are shown in door closed position in FIG. 4 and in door open position in FIG. 5. Thus, spring means 40, whose connection at 41 with the housing acts as a center over which the door strut bars pass, is an over-the-center means of urging the door to open position when closed (FIGS. 4) or to closed position when open (FIG. 5).

The door frame 33 has a cradle generally indicated at 42 mounted thereon. The cradle (FIGS. 6, 7 & 9) has vertically extending side walls 43 the outer or front edge portions of which are bolted at 44 to the door frame angular members 34. An upwardly, outwardly extending top wall 45 and a downwardly, outwardly angled bottom wall 46 connect the upper and lower ends of cradle side walls 43 forming an outer generally rectangular contour matching and fitting within the boxlike frame F of the housing 5 when the cradle-door 42-33 is in closed position as shown, for example, in FIG. 4.

The inner vertically extending, longitudinal edges of the cradle side walls 43 have back wall portions 47 extending toward each other and joined with a cylindrical cradle passage wall generally indicated at 48 at diametrically opposed areas as shown in FIG. 9. Referring to FIGS. 4, 9 and 13, the cradle 42 nests within the housing 5 when the cradle-door is in the closed position of FIG. 4. The upper portion of the cylindrical cradle passage wall 48 is cut away at 49 so that the wall 48 above the zone 49 is semicircular at 49a and below the zone 49 is circular in cross section as indicated at 49b (FIG. 5). The cradle passage wall portion 49b extends downwardly to a lower angular end 50, where it intersects with the cradle bottom wall 46.

A half-moon shaped flanged shelf member 51 is mounted by screws 52 at the lower end of cradle cylindrical portion 49b, and a flexible bumper pad 53 is mounted on the top of the shelf 51 to cushion and arrest movement of a carrier as it is discharged into the cradle, as indicated by the carrier 54 in FIG. 4. When the cradle-door is closed as shown in FIG. 4, the nesting of the cradle within the housing cylindrical portion 11 mates with portions of the housing wall above, opposite and below the rear boxlike compartment 19.

In other words, the semicircular upper cradle wall portion 49a forms a cylindrical passage continuation with a semicircular portion of the housing wall 11 where the housing is cut out by the intersection of the frame F (FIGS. 13 & 23). Further, the housing cylindrical passage wall 11 is offset from 55 to 56 where the boxlike rear compartment 19 joins the housing, to permit nesting of the cradle cylindrical portion 49b below the offset 55 (FIGS. 4 & 5) and above offset 56, so that the cradle wall generally indicated at 48 forms an extension of or continuation of the housing cylindrical passage wall 11 when the cradle door is closed for receiving the carrier 54 arriving at the terminal.

The lower housing cylindrical end portion 18 being axially aligned with and having the same diameter as the upper housing cylindrical end portion 11 thus is axially aligned with the cylindrical passage portion 49b of the cradle. As shown in FIG. 4 the cradle cylindrical passage wall portion 49b has the same diameter as that of the housing cylindrical upper and lower end portions 11 and 18. Thus, when the cradle-door is closed as shown in FIG. 4, the cylindrical cradle wall portion 49b and the semicircular cradle wall portion 49a are complementary to the housing cylindrical wall portions where cut out; and the cradle form with the housing, when the cradle-door is closed, a cylindrical continuation or connection between the spaced housing cylindrical end portions 11 and 18.

The cradle 42 has two spaced, longitudinally outwardly extending, rectangular upper and lower recesses 57 and 58 formed in the cylindrical passage wall 48 (FIG. 6) in one of which a carrier arrival switch actuator, generally indicated at 59, selectively is mounted, as shown in FIGS. 4–8. When the terminal is installed for carrier arrival from above, the switch actuator 59 is installed in the lower cradle recess 58.

Actuator 59 is mounted on the lower stub shaft end 60 of a double-bent crank arm 61 having an upper, outer, flattened end 62 projecting generally upwardly of the cradle adjacent the righthand door member 34 (viewing FIG. 6) at the outside of the cradle cylindrical passage wall portion 48. The lower stub shaft end 60 is pivotally journaled at 63 in wall portions of the upper end of the lower cradle recess 58, so that the crank arm 61 is pivotally mounted on the cradle biased clockwise (FIGS. 7 & 8) by spring 64 connected between the cradle and crank arm.

The normal biased position of the flattened end 62 (FIG. 7) of the crank arm is adjusted by adjusting screw 65 so that the flattened end 62 engages arrival switch means 66 to normally hold the switch means 66 in one position of actuation.

Actuator 59 is an elongated shoelike member having a bifurcated end 67; and its other end mounted on the stub shaft 60 is connected in fixed position on the stub shaft 60 by a removable hook-shaped pin 68. One end of pin 68 extends through a hole in the stub shaft 60 and the other hooked end 69 of pin 68 engages a mounting pin 70 connected between the prongs of the actuator bifurcated end 67. In this manner the actuator 59 is fixed to stub shaft 60 with the pin 68 acting as a connecting key so that the normal biased position of crank arm 61 holds the actuator 59 with its bifurcated end 67 projecting out of recess 58 into the cradle passage formed by wall 48.

An arriving carrier 54 thus engages the actuator end 67, as shown in FIGS. 4 and 8, to rotate carrier arrival switch actuator 59 counterclockwise (FIG. 8) about the pivot formed by stub shaft 60, thereby releasing the end 62 of crank arm 61 from arrival switch means 66. When released, the switch means 66 assumes its other position of actuation the consequence of which is described below.

The fixed keyed connection of actuator 59 to the stub shaft 60 by key-pin 68 is important. It permits the arrival switch means 66 to be mounted on the cradle outside of the cylindrical cradle passage formed by the wall 48, while the arrival switch actuator 59 is mounted within the cradle and projects into the passageway. However, this arrangement of the components subjects the key connection to repeated shock occasioned by the forces exerted by a carrier and absorbed upon arrival at the terminal. The arrangement shown and described permits repair and maintenance of the keyed connection to be readily performed. Thus, the hooked end 69 of the key pin 68 may be released from mounting pin 70 and the pin 68 removed endwise from the actuator 59 and replaced by a new pin to provide an accurate key connection between the actuator 59 and the stub shaft 60 of crank arm 61, when required as a result of the shock to which the parts are subjected by carrier arrival forces.

The terminal 1 is provided with an "open door" switch 71 and a "closed door" switch 72 shown in FIGS. 10, 11 and 12 which form part of the control means for the operation of the teller terminal. These control switches 71 and 72 are mounted on the mounting plates 6 at either side of the terminal (FIG. 10) below the journals 37 for the pivot rod 36 on which the door frame 33 is pivotally mounted for movement between open and closed positions (FIGS. 6 and 10).

Cams 73 and 74 for actuating switches 71 and 72, respectively, are fixed to and move with pivot rod 36 adjacent the respective journals 37 for the pivot rod (FIGS. 6 & 10).

The lower end 35 of one of the spaced vertical door frame members 34, and a portion of its related strut bar 38 when the door is in closed position are shown in full lines in FIG. 11. The arrow 75 indicates movement of the door from closed to dot-dash open position. Cam 73 similarly is shown in full and dot-dash lines respectively for closed and open positions of the door. Cam 73 actuates switch 71, as shown in FIG. 11, as the door reaches open position, for a purpose to be described later.

Portions of a door member lower end 35 and of a strut bar 38 when the door is in open position are shown in full lines in FIG. 12 and in dot-dash lines when the door is closed. Door movement from open to closed position is indicated by the arrow 76. The cam 74 for the closed door switch 72 also is shown in full and dot-dash lines respectively for open and closed positions of the door. When the door reaches closed position cam 74 engages and actuates closed door switch 72 for a purpose also described below.

The terminal 1 is provided with a latch mechanism best shown in FIGS. 5, 14, 14A, 15, 16 and 17. The latch mechanism is indicated generally at 77 and includes a pawl 78, and a lever 79, both of which are pivotally supported respectively at 80 and 81 on pivot shafts mounted on and between spaced parallel plates 82 extending rearwardly preferably integrally from the cylindrical passage wall 48 of the cradle. Spring means 83 having a central portion 84 coiled about pivot shaft 81 has extended end loops 85 and 86 respectively engaging pawl 78 and lever 79 to hold the pawl and lever in one or another of two cooperative interengaged relative positions of actuation.

Pawl 78 is formed with notches 87 and 88 with an intervening stop projection 89, all adjacent the upper end of lever 79. The upper end of lever 79 is formed with a stop portion 90 projecting toward pawl 78.

Figure 14:
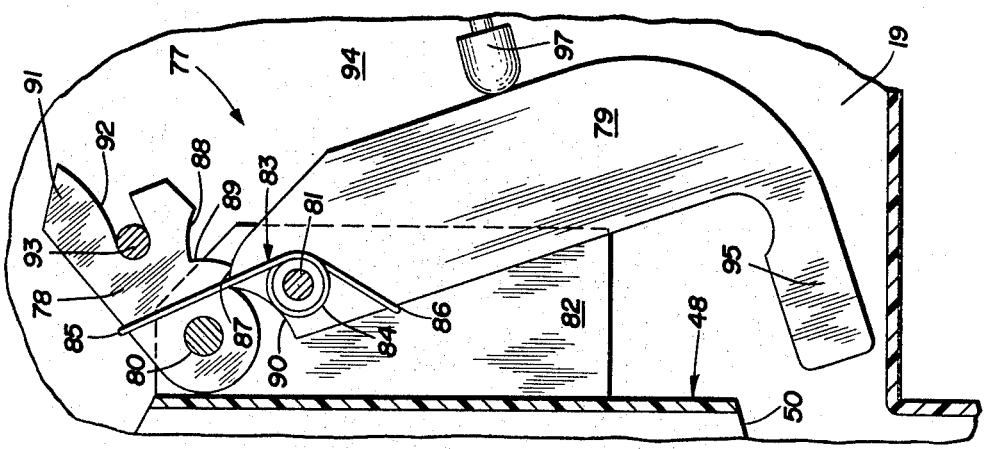
FIG. 14 is an enlarged somewhat diagrammatic view of the new cradle-door control latch mechanism in latched position, as in FIGS. 3 and 18, locking the cradle-door closed.
Figure 15:
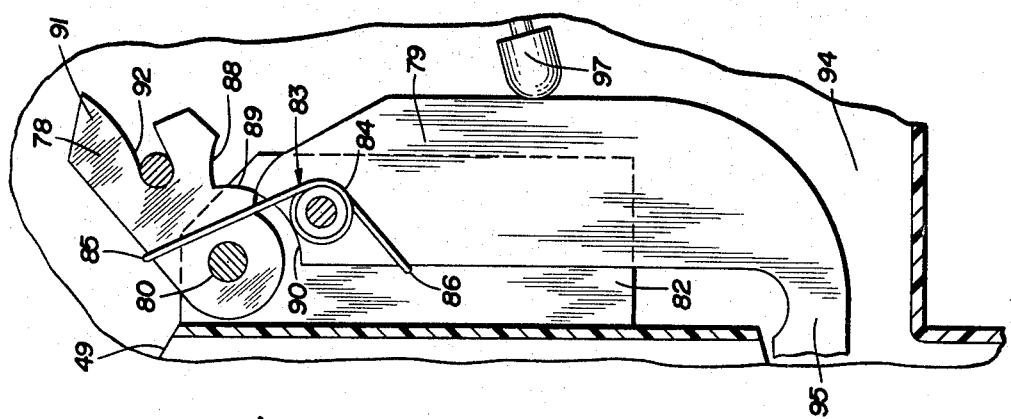
FIG. 15 is a view similar to FIG. 14 showing the latch mechanism after solenoid actuation with the latch components moved partly toward unlatched position.
Figure 16:
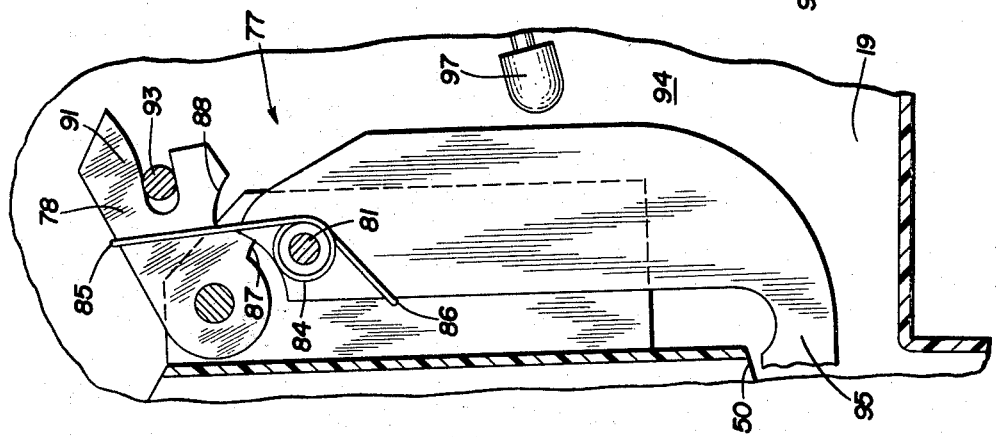
FIG. 16 is a view similar to FIGS. 14 and 15 illustrating further relative movement between components of the latch mechanism toward unlatched position.

In normal position, when the cradle-door is closed, the lever stop portion 90 is held seated in the pawl notch 87 by the spring 83 as shown in FIG. 14. The pawl is formed at its end 91 remote from its pivot mounting on shaft 80 with a forked slot 92 which is latched to or in locked engagement with (when the cradle-door is closed) a latch member 93 mounted on the housing 5 extending between spaced vertical wall portions 94 of rear box-like housing compartment 19 (FIG. 14). Thus, the latch mechanism 77 when in normal latched position when the cradle-door is in closed position, locks the cradle-door in closed position.

Latch lever 79 has a hook formation 95 projecting from its lower end toward but spaced from the lower end of the cradle cylindrical passage wall 48 in normal closed locked position of the cradle-door (FIG. 14). This hook 95 is not used when the terminal is installed for carrier arrival from above.

Figure 17:
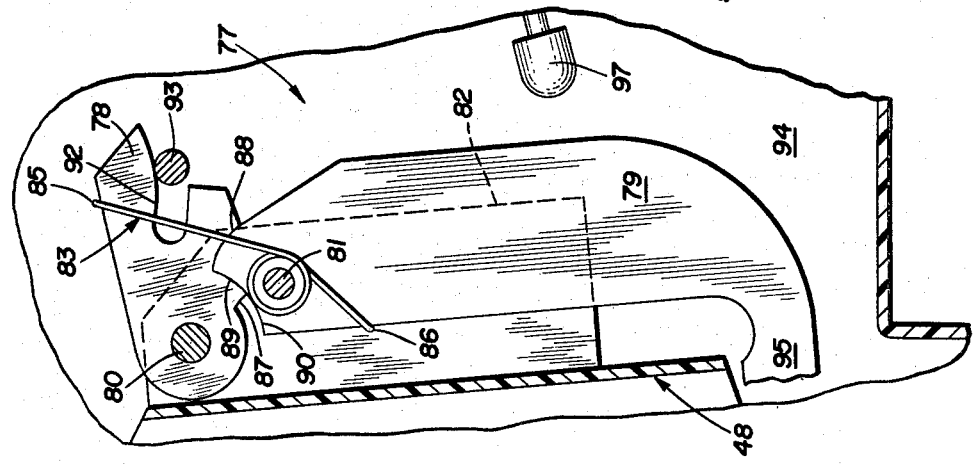
FIG. 17 is a view similar to FIGS. 14–16 with the latch mechanism in unlatched position, completely unlocking the cradle-door and permitting further biased opening movement.

The latch mechanism 77 is provided with a solenoid 96 mounted within the rear housing compartment 19 spaced from and behind the pawl 78 and lever 79 (FIGS. 3, 18 and 20) and having an armature 97 which normally is in unactuated retracted position as shown in FIGS. 3 and 14. When the solenoid is energized, armature 97 is projected forcefully toward lever 79 moving the lever from the position of FIG. 14 initially to that of FIG. 15 which pivots lever 79 about pivot shaft 81, releasing (FIG. 15) stop portion 90 of lever 79 from pawl notch 87 and pawl stop projection 89. When the pawl and lever portions are so released, spring loop 85 urges pawl 78 to rotate clockwise about pivot shaft 80, partial such pivot movement being illustrated in FIG. 16, which pivot movement of pawl 78 continues until lever stop portion 90 seats in pawl notch 88, as shown in FIG. 17.

The various movements of the latch mechanism 77 just described, upon the solenoid being energized and its armature 97 actuated forcefully to drive the lever 79 from latched position (FIG. 14) to pawl and lever unlatched position (FIG. 17), occur almost instantaneously. During such movements the forked slot 92 of pawl 78 is disengaged from housing latch member 93, and at the same time the cradle-door, which is unrestrained and unlocked, pivots from closed position of FIG. 4 to open position of FIG. 5, urged by spring 40.

In this manner, when a carrier 54 is located in the cradle-door and the cradle-door unlocked, the carrier is presented outside of the housing 5 to a teller (FIG. 5).

The simple latch mechanism 77 of few parts just described is also used and operated in the same manner when the terminal is installed for carrier arrival from below, as subsequently outlined in succeeding portions of this specificaton.

When it is desired to close the cradle-door, after unlocking and opening just described, it is manually pushed, accompanied by action of the spring 40, to closed position. As the cradle-door is closed, the pawl forked slot 92 engages housing latch member 93 and the relative movements of the parts during closing is reversed from those of opening, as illustrated progressively from FIG. 17 through FIGS. 16, 15 and to the positions of the mechanism components shown in FIG. 14, when the cradle-door is latch locked in closed position with respect to the housing 5.

One of the major aspects or features of the invention involves the use of a terminal housing having the same primary or basic structure for installation either for carrier arrival from above or for carrier arrival from below. This basic housing structure is modified slightly depending upon the type of installation involved.

In accordance with the invention, the housing preferably is formed as a molded plastic component and may be molded from Marlex CL100 Cross-linked Polyethelene. The primary or basic molded plastic housing member, before modification, is illustrated in FIGS. 3 and 23 and is identified generally at 5H.

When the basic housing component 5H is to be installed for carrier arrival from above, the extreme upper end of the upper housing cylindrical end portion 11 is cut off at the location indicated by the dot-dash line 98. The cut off end portion 99 is discarded. Thus, the housing component 5H, as illustrated in FIG. 3, after cutting off the end portion 99, becomes the housing 5 illustrated in FIGS. 1, 4, 5, 10 and 13.

Furthermore, the molded housing component 5H is modified for installation for carrier arrival either from above or from below by cutting off the closed end of the outlet nipple 20 at the location of the dot-dash line 100 in FIG. 3 so that tube 21 may be coupled with the nipple 20 (FIG. 1).

When the basic moled plastic housing component 5H is modified for installation for carrier arrival from below, as shown in FIGS. 18, 19 and 20, lower end pieces of the lower cylindrical end portion 18 of the housing 5H are cut off at dot-dash lines 101 and 102 (FIG. 3) producing a cup-shaped piece 103 and a sleeve 104. The sleeve 104 is discarded while the cup-shaped piece 103 is telescoped into the closed end 105 of the upper housing cylindrical end portion 11A of the housing member 5A of teller terminal 1A shown in FIGS. 18 and 19.

The cup-shaped member 103 may be secured at 106 (FIG. 18) within the closed end 105 of housing end portion 11A. An additional bumper member 107 may be secured to the cup-shaped member 103 at 108 to assist in arresting movement of a carrier 54 arriving from below.

The lower cylindrical end portion 18 of housing member 5A, after removal of pieces 103 and 104 as illustrated in FIG. 3, may be coupled (not shown) with an end of a system conveyor tube directed upwardly of the installation below the terminal 1A in the same manner as the conveyor tube 15 is coupled with the terminal 1 at 14 as illustrated in FIGS. 1, 4 and 5.

A shouldered retainer member 109 is pivotally mounted in a recess 110 formed in housing 5A, on pivot pin 111 normally biased by spring 112 to project into the cylindrical compartment formed by the housing 5A and a cradle-door mounted thereon as shown in FIG. 18. Arriving carrier 54 moving in the direction of the arrow 113 pushes retainer member 109 into recess 110 and strikes bumper 107 which arrests carrier movement and the carrier 54 drops down and its wear ring is engaged by retainer member 109 which has been biased outward to the position shown in FIG. 18, after the upper end of the carrier passes it and carrier movement is arrested, thus holding the carrier 54 in the cradle-door.

The other modification made in the installation of the terminal 1A for carrier arrival from below is to locate the arrival switch actuator 59 and related crank arm 61 and arrival switch means 66 in the upper cradle recess 57 and along the lefthand cradle side wall 43 as shown in FIGS. 18, 19, 21 and 22.

The arrival switch actuator 59 in FIG. 18 upon arrival of the carrier 54 in the terminal 1A is actuated by the leading end of the carrier, in the same manner as the actuator 59 is actuated by the leading end of the carrier 4 when arriving from above as in FIG. 4.

The construction and operation of the terminals 1 and 1A and their components otherwise are the same in each mode of installing the mechanism; except that the moon-shaped shelf 51 and bumper pad 53 present in the terminal 1 are omitted in the terminal 1A.

Further, when the latch mechanism 77 is actuated by the solenoid 96 in the terminal 1A of FIGS. 18 and 19 to unlock the cradle-door, the hooked end 95 on lever 79 in the unlatched position of the latch mechanism, as shown in FIG. 19, extends below the lower end of the cradle cylindrical passage wall 48 to hold the carrier 54 in the cradle as the cradle-door opens and the cradle-door and carrier move away from the retainer member 109.

A pneumatic tube system in which the improved teller terminal 1 or 1A is a component, as stated, may have a customer terminal as a part of the system as well as an air shifter and an air pump or blower connected with the conveyor tube, which air shifter and blower commoly are located in the region of the customer terminal. Such blower and air shifter may be of known construction such as illustrated in U.S. Pat. Nos. 4,059,246 and 3,232,559.

Figure 25:
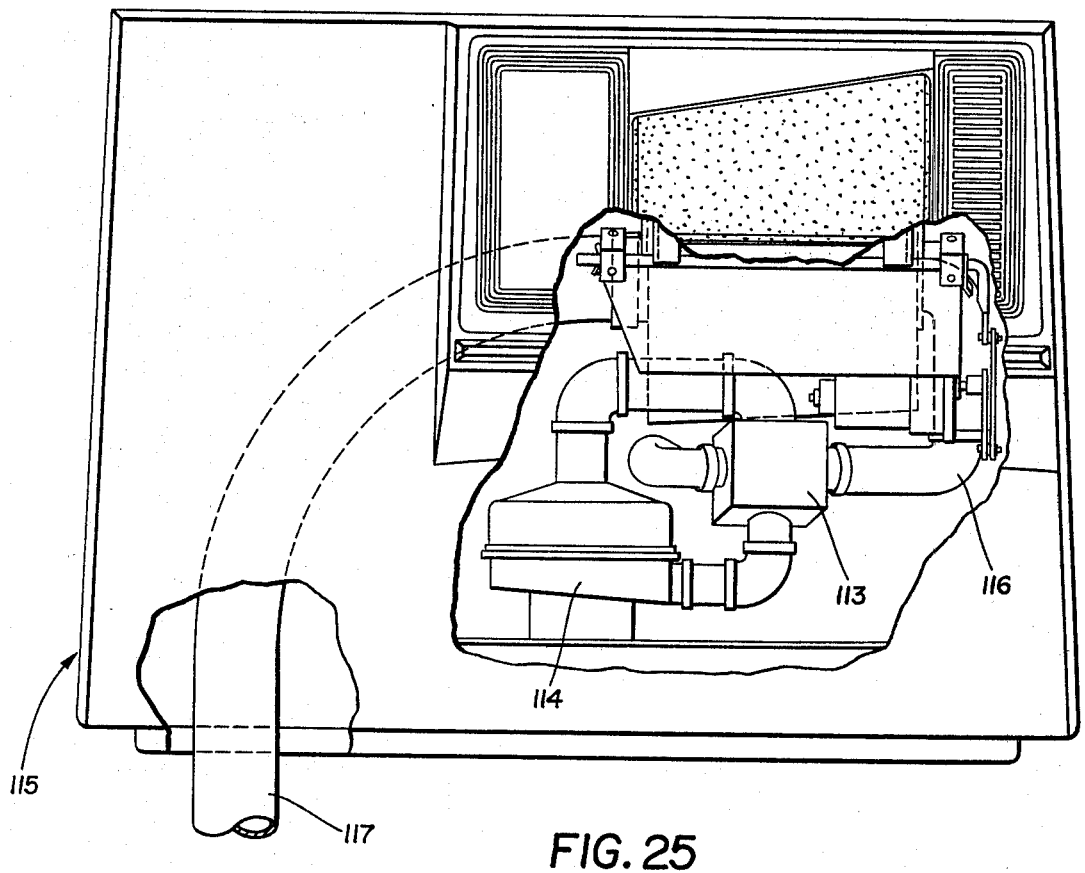
FIG. 25 is a diagrammatic view with parts broken away showing a blower and air shifter for the system housed within a system customer terminal cabinet.
Figure 24:
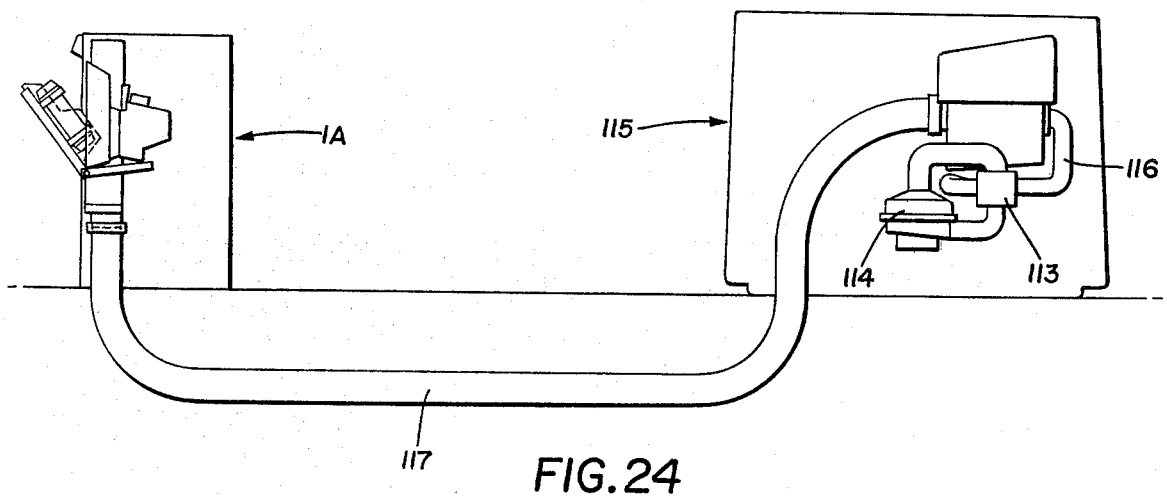
FIG. 24 is a diagrammatic view of a pneumatic tube system equipped with the new teller terminal construction.

For example, the air shifter and blower may be located in a customer terminal for the pneumatic tube system as diagrammatically shown in copending application Ser. No. 156,690; and as shown in FIGS. 24 and 25. The air shifter 113 and blower 114 may be housed in the customer terminal generally indicated at 115 wherein a vacuum connection V and a pressure connection P may extend between the blower 114 and air shifter 113. The air shifter 113 may be connected by tube 116 with the customer terminal housing for supplying pressure or vacuum thereto.

As shown in FIG. 24, the pneumatic tube system conveyor tube 117 connects the customer terminal 115 with the teller terminal 1 or 1A, terminal 1A being diagrammatically indicated in FIG. 24, since the view shows carrier arrival from below as described in connection with FIGS. 18-23.

In any event, the blower and air shifter provide a condition of pressure or vacuum in the terminal housing 1 or 1A depending upon the mode in which the system is being operated at any particular time. In order to avoid loss of air pressure or vacuum within the terminal 1 or 1A when the cradle-door is closed, the gasket seal 32 provides a seal between the perimeter of the door opening in the housing as shown in FIG. 23 and the perimeter of the cradle walls of the cradle-door.

The system also is provided with control circuitry in the usual manner in which the carrier arrival switch means, regardless of its location in the cradle, is connected. Also, the open and closed door switches 71 and 72 are connected in such control circuitry.

The operation of the teller terminal 1 installed for carrier arrival from above first is described with reference to FIGS. 4-12. A carrier 54, as shown in FIG. 4, arrives at terminal 1 and is stopped in the cradle by shelf 51 and bumper pad 53. In order to reduce recurring impact forces imparted by the carrier arriving, usually under pressure from the system conveyor tube, cushioning pressure builds up in the closed lower cylindrical end portion 18 of the terminal housing 5. This pressure is dissipated through the compartment 19, tube 21 and muffler 22 through which air may escape. The flapper valve 25 connected with the outer end of the muffler 22 prevents the escape of pressure through outlet port 24 when a condition of pressure exists in the terminal housing 5.

Upon carrier arrival and support on shelf 51, arrival switch actuator 59 is moved by the carrier to the position shown in FIGS. 4 and 8, releasing arrival switch means 66 which, through the control circuitry, energizes solenoid 96 the armature 97 of which moves latch mechanism lever 79 to unlatched position accompanied by unlocking the cradle-door which moves to open position biased by spring means 40.

When the cradle-door arrives at open position, by the movement indicated by arrow 75 in FIG. 11, cam 73 actuates open door switch 71, which, through the control circuitry, de-energizes the system blower and reverses the air shifter. The open cradle-door containing the arrived carrier 54 presents the carrier to the teller as shown in FIG. 5. The teller removes the carrier 54 from the cradle and processes the banking media and then returns the carrier 54 to the cradle, so that the carrier can be sent back to the customer at a customer terminal at the other end of the system to complete the banking transaction.

The teller, when replacing the carrier in the cradle, manually pushes the cradle-door closed, which actuates the latch mechanism automatically to lock the cradle-door in closed position.

The closing movement is indicated by the arrow 76 in FIG. 12; and the closed door switch 72 is actuated by cam 74 when the cradle-door reaches closed position, energizing the system blower which supplies vacuum to the housing 5, the flapper valve 25 opening to permit air intake to the housing in response to the condition of vacuum established by the system blower and air shifter.

The vacuum in housing 5 lifts carrier 54 from the cradle and sucks the carrier into the system conveyor tube 15 to deliver it to a customer terminal.

The operation of the terminal 1A is similar to that of terminal 1. Carrier movement is arrested in the housing by engagement with bumper 107 and the carrier drops to the position shown in FIG. 18 by gravity. When the carrier is returned to the housing 5A by closure of the cradle-door, the cradle-door automatically is locked closed as shown in FIG. 18. During closing movement of the cradle-door the carrier is supported by the hook on lever 79 at a lower position (FIG. 19) than shown in FIG. 18, and is not held by retainer 109, but drops by gravity from the housing 5A into the system conveyor tube. Meanwhile, vacuum is established in the system by actuation of the closed door switch 72, and the vacuum delivers the carrier to a customer terminal.

The new concepts of the various new pneumatic tube system teller terminal features and constructions thus provide a more simplified terminal with a simple basic housing member which may be modified for installation for carrier arrival from either above or below; provide an extremely simple latch mechanism mounted on a cradle which forms part of the door for the terminal effective automatically to lock the cradle-door closed when moved to closed position, and effective to retain a carrier in the cradle during certain movements of the cradle-door in a carrier arrival from below installation; provide a construction which eliminates the necessity of a motor for movement of the cradle-door in either direction between open and closed positions; and provides a unique cooperative relation between complementary cylindrical wall portions of the terminal housing and cradle-door hinged to the housing which form a cylindrical continuation of the pneumatic system conveyor tube connected with the terminal from either above or below the housing.

Accordingly, the concepts of various aspects of the invention described in detail provide a new pneumatic tube banking system terminal construction having cooperatively arranged components of a simplified character which achieve the stated objectives, eliminate difficulties arising with prior devices, and solve problems and obtain the new results described.

In the foregoing description, certain details have been used for brevity, clearness and understanding; but no unnecessary limitations are to be implied therefrom beyond the requirements of the prior art because such terms are used for descriptive purposes and are intended to be broadly construed.

Moreover, the detailed description and illustration of the invention is by way of example, and the scope of the invention is not limited to the exact details shown or described.

Having now described the features, discoveries and principles of the invention, the manner in which the terminal equipment and mechanisms thereof are constructed and operated, and the advantageous, new and useful results obtained; the new and useful structures, devices, elements, arrangements, parts, combinations and cooperative relationships are set forth in the appended claims.

I claim:

1. In a banking service pneumatic tube system of a type having a single conveyor tube for transporting a carrier between customer and teller terminals in which a carrier is removable from either terminal, and in which a vertically extending conveyor tube end is adapted to be connected with the teller terminal for carrier arrival and sending to and from the terminal; the improvement in which the teller terminal includes:

(1) a terminal housing having cylindrically curved wall portions forming a vertically extending passage terminating in cylindrical end portions one of which is closed;

(2) means for coupling the other housing end portion with said vertically extending conveyor tube end;

(3) the housing wall portions being formed with an opening communicating with said passage between said cylindrical end portions;

(4) door means having a cradle mounted thereon forming a cradle-door for closing said housing opening;
(5) the cradle-door being pivotally mounted on the housing movable between open and closed positions;
(6) portions of the housing passage walls being laterally outwardly offset opposite said housing opening;
(7) the cradle having cylindrically curved wall portions complementary to the housing walls where said opening and offset portions are formed nested within the offset portions to complete the formation of a cylindrical passage in the housing between said cylindrical end portions when the cradle-door is closed;
(8) latch means mounted on the cradle engageable with a latch member mounted in the housing automatically locking the cradle-door closed, when the cradle-door is moved toward closed position;
(9) spring means biasing the cradle-door to open position when the cradle-door is unlocked;
(10) means for actuating the latch means to unlock the cradle-door in response to arrival of a carrier in the cradle; and
(11) means for supporting a carrier in the cradle upon arrival therein.

2. The construction defined in claim 1 in which the housing has top, bottom, side and back wall portions, generally rectangularly arranged and projecting from passage-forming housing wall portions surrounding said housing opening, forming a boxlike frame for the housing opening; in which the cradle has top, bottom, side and back wall portions surrounding its cylindrically curved wall portions complementary in shape to and nestable within the housing rectangularly arranged wall portions; and in which seal means are located in said boxlike frame surrounding the housing opening engaged by said complementary nestable cradle wall portions when the cradle-door is closed, sealing the housing passage against air leakage during pneumatic tube system operation.

3. The construction defined in claim 2 in which the top and bottom housing frame wall portions are tapered respectively outwardly upwardly and outwardly downwardly and the housing frame side wall portions are parallel; and in which the cradle top and bottom wall portions are similarly tapered to nest within the housing frame walls when the cradle-door is closed.

4. The construction defined in claim 1 in which the cradle-door has angular strut means mounted thereon; in which the spring means biasing the cradle-door is connected at one end with the housing and at the other end with the strut means at a location remote from the cradle-door pivot mounting; and in which the strut means passes across the location of the spring means connection with the housing when the strut means moves from cradle-door closed to open position and vice versa; whereby the spring means biases the cradle-door to open from closed position and to closed from open position.

5. The construction defined in claim 1 in which a cradle cylindrically curved wall portion remote from the cradle-door pivotal mounting is semicircular in cross section, and in which a cradle cylindrically curved wall portion adjacent said pivot mounting is circular in cross section.

6. The construction defined in claim 5 in which the latch means are mounted on said circular cradle wall portion outside of the cylindrical compartment formed by said cylindrical wall portion.

7. The construction defined in claim 6 in which the housing is formed with a rear boxlike compartment communicating with the housing passage through a second opening formed in the passage walls opposite the housing opening; in which said latch member, with which the latch means is engageable, is mounted in said rear compartment; and in which the latch means mounted on the cradle project into said rear compartment when the cradle-door is closed to permit latched engagement of the latch means with said housing latch member.

8. The construction defined in claim 1 in which the means for actuating the latch means to unlock the cradle-door includes carrier arrival switch means mounted on the cradle; in which actuator means are pivotally mounted on the cradle biased to project a portion thereof into the path of movement of a carrier arriving in the cradle when the cradle-door is closed; in which said projecting portion is actuated by such carrier to enable said arrival switch means, and means energized in response to actuation of said arrival switch means to operate said latch means from latched to unlatched mode to unlock the cradle-door.

9. The construction defined in claim 8 in which the means energized in response to actuation of said arrival switch means is solenoid means mounted in said housing having an armature which operates the latch means to unlatched mode when the solenoid means is energized.

10. The construction defined in claim 1 in which the housing is formed with a rear boxlike compartment communicating with the housing passage through a second opening formed in the passage walls opposite the housing opening; in which said housing latch member is mounted in said rear compartment; in which said latch means projects into said rear compartment and is engaged in latched position with said latch member; and in which the means for actuating the latch means includes a device located in said rear compartment movable to unlatch the latch means to unlock the cradle-door.

11. The construction defined in claim 10 in which the device located in said rear compartment is a solenoid armature.

12. The construction defined in claim 10 in which an air system muffler communicates with said rear compartment; and in which said muffler is provided with flapper valve means closed when the housing is subjected to pneumatic tube system pressure and open when the housing is subjected to pneumatic tube system vacuum.

13. The construction defined in claim 1 in which the tube system is provided with blower means and air shifter means operative to deliver a carrier to the teller terminal; in which the housing is provided with open door switch means; and in which the open door switch means is actuated when the spring means opens the cradle-door to disable the blower means and reverses the air shifter.

14. The construction defined in claim 13 in which the housing is provided with closed door switch means; and in which the closed door switch means is actuated upon closing the cradle-door to closed latched position to enable the blower means.

15. The construction defined in claim 1 in which the latch means includes a pawl and a lever pivotally mounted at spaced positions on the cradle having selectively interengageable notch and stop projections; in which the latch pawl and lever are in latched mode when in one interengaged position and are in unlatched mode when in another interengaged position; and spring means engaged with each of the pawl and lever biasing the pawl and lever to the other position when released from interengagement in the position of one mode.

16. In a terminal for a banking service pneumatic tube system of a type in which a single conveyor tube transmits a carrier to the terminal, in which the carrier is removable from the terminal, in which the terminal has a housing opening closed by a door pivotally mounted for movement between open and closed positions on the housing, in which a cradle for receiving a carrier transmitted in the system to the terminal is mounted on the door forming a cradle-door and is located in the housing when the door is closed; and in which the cradle-door is provided with latch means for locking the cradle-door closed when in closed position; the improvement in which the latch means includes:
   (1) a pawl and a lever pivotally mounted at spaced positions on the cradle;
   (2) the pawl and lever having selectively interengage-engageable notch and stop projections;
   (3) a latch member mounted on the terminal housing;
   (4) the pawl and lever having two positions of interengagement, one of which is a latched mode and the other of which is an unlatched mode with respect to said latch member; and
   (5) spring means engaged with each of the pawl and lever biasing the pawl and lever from one mode position to the other when either the pawl or lever is released from interengagement in the position of either of the modes.

17. The construction defined in claim 16 in which means is provided for rotating said lever on its pivot mounting in one direction when in latched position to enable biased rotary movement by said spring means of the pawl in said one direction on its pivot mounting to unlatched position.

18. The construction defined in claim 17 in which said means for rotating said lever on its pivot mounting in one direction is a solenoid mounted in the terminal housing.

19. The construction defined in claim 16 in which when the pawl and lever are in unlatched position and the door is open and is moved toward closed position, during such movement the pawl is engaged by said latch member and rotated on its pivot mounting in the other direction to enable biased rotary movement by said spring means of the lever in said other direction on its pivot mounting to latched position.

20. The construction defined in claim 19 in which the pawl has a forked slot spaced from its pivot mounting on the cradle which engages said latch member to rotate the pawl in said other direction.

21. In a terminal for a banking service pneumatic tube system of a type in which a single conveyor tube transmits a carrier to the terminal, in which the carrier is removable from the terminal, in which the terminal has a housing opening closed by a door pivotally mounted for movement between open and closed positions on the housing, in which a cradle for receiving a carrier transmitted in the system to the terminal is mounted on the door forming a cradle-door and is located in the housing when the door is closed; and in which the cradle-door is provided with latch means for locking the cradle-door closed when in closed position; the improvement in which the latch means includes:
   (1) a pawl and a lever pivotally mounted at spaced positions on the cradle;
   (2) the pawl having first and second notches separated by a stop portion projecting toward the lever;
   (3) the lever having a stop portion projecting toward the pawl and selectively engaged with said first or second notch when the pawl and lever are in latched or unlatched positions respectively;
   (4) a latch member mounted on the terminal housing;
   (5) the pawl having a slot engaged with said latch member when the pawl and lever are in latched position with the lever stop portion engaged with said first notch to retain the pawl in latched position;
   (6) spring means engaged with each of the pawl and lever biasing the pawl when in latched position to rotate to unlatched position in one direction on its pivot mounting to disengage said latch member in response to rotary movement of said lever in said one direction on its pivot mounting to release the lever stop portion from said first pawl notch and to establish engagement of said lever stop portion with said second pawl notch; and
   (7) said spring means, upon engagement of said pawl with said latch member when moved toward said latch member and resultant rotation by such engagement of said pawl in the other direction on its pivot mounting to release said lever stop portion from said second pawl notch, biasing said lever to rotate in said other direction on its pivot mounting to engage the lever stop portion in said first pawl notch in latched position.

22. In a banking service pneumatic tube system of a type having a single conveyor tube for transporting a carrier between customer and teller terminals in which a carrier is removable from either terminal, and in which a vertically extending conveyor tube end is adapted to be connected with the teller terminal for carrier arrival and sending to and from the terminal; the improvement in which the teller terminal includes:
   (1) a terminal housing having cylindrically curved wall portions forming a vertically extending passage terminating in cylindrical end portions one of which is closed;
   (2) means for coupling the other housing end portion with said vertically extending conveyor tube end;
   (3) the housing wall portions being formed with an opening communicating with said passage between said cylindrical end portions;
   (4) door means having a cradle mounted thereon forming a cradle-door for closing said housing opening;
   (5) the cradle-door being pivotally mounted on the housing movable between open and closed positions;
   (6) the cradle having a cylindrical wall portion aligned with and between the housing cylindrical end portions in which a carrier is received when the cradle-door is closed;
   (7) means for supporting a carrier in the cradle upon arrival therein;

(8) means automatically pivotally opening the cradle-door with a carrier in the cylindrical cradle portion upon carrier arrival at the terminal;

(9) the vertically extending housing passage wall being open at the bottom end portion and closed at the top end portion;

(10) the means for supporting a carrier in the cradle comprising a retaining member located adjacent a swinging end of said pivotally mounted cradle-door, and pivotally mounted on the housing biased to project into the passage when the cradle-door is closed;

(11) the means automatically pivotally opening the cradle-door having carrier arrival switch means mounted on the cradle-door adjacent said swinging end of the cradle-door, said arrival switch being actuated in response to arrival of the carrier in the cradle-door; and

(12) latch means mounted on the cradle engageable with a latch member mounted in the housing locking the cradle-door closed when the cradle-door is moved toward closed position, said latch means having a hook portion projecting into the passage formed by the cradle cylindrical wall portion adjacent the pivotal mounting of the cradle-door on the housing as the cradle-door is moved toward closed position.

* * * * *